Patented Apr. 11, 1933

1,903,500

UNITED STATES PATENT OFFICE

WILLIAM S. CALCOTT, OF PENNS GROVE, FREDERICK B. DOWNING, OF CARNEYS POINT, AND DONALD H. POWERS, OF PENNS GROVE, NEW JERSEY, ASSIGNORS TO E. I. DU PONT DE NEMOURS & COMPANY, OF WILMINGTON, DELAWARE, A CORPORATION OF DELAWARE

SYNTHETIC RUBBER AND PROCESS OF ITS MANUFACTURE REISSUED

No Drawing. Application filed August 12, 1927. Serial No. 212,605.

This invention relates to the manufacture of synthetic materials resembling rubber in their physical properties, and more particularly to such materials as may be prepared from certain polymerizable hydrocarbons by the process hereinafter described in detail.

Much work has been done in the past on the synthesis of rubber-like materials by the polymerization of hydrocarbons. Due to the nature of the processes employed in their production the resulting products were wholly unsuitable for soft rubber substitutes, though satisfactory to a certain extent for hard rubber. Synthetic rubber therefore never reached the commercial stage except for a brief period during the recent war, the material being unsatisfactory as regards both properties and price.

The object of this invention is to produce synthetic or partially synthetic rubber-like materials of sufficiently low price and high quality to be marketable.

Among the numerous advantages of the products of the new process over prior products of this type is the fact that, while the prior methods gave products of little elasticity, difficult or impossible to mill, curable to hard rubber with difficulty, and entirely unsuitable for soft rubber, this process gives a product of high elasticity, easily milled and workable by the usual methods and machinery used for rubber, and suitable for the soft or elastic type of rubber goods as well as the hard. Physically, the product differs from the materials previously produced in that it possesses a definite structure resembling that of rubber instead of being merely a colloidal solution of polymers in each other. The process also represents a fundamental improvement over the prior art as regards the number of steps between the raw material and finished article.

These objects are attained by the conversion of polymerizable hydrocarbons, by a few simple steps, into products possessing a structure closely similar to that of rubber and hence possessing similar physical properties. The simplicity of the process tends to lower the cost while a product of high quality is attained by the development of a structure similar to, if not identical with, that of rubber itself.

Products suitable as starting materials for this process comprise a wide variety of such hydrocarbons as the dienes (butadiene, isoprene, methyl isoprene, 1:4 dimethylbutadiene, etc.) the -trienes, the vinyl-acetylenes, the divinylacetylenes and the reduction products obtaind by the hydrogenation of the vinyl and divinyl acetylenes. More generally it may be stated that a given hydrocarbon can be satisfactorily employed in this synthesis provided it be a liquid or gas at normal room temperatures, and polymerizable to a more viscous liquid from which the polymer does not separate in crystalline form. A further condition is that it must be possible to stop, or slow up to the practical equivalent of stopping, the polymerization at the desired point.

A still further property requisite for the hydrocarbons to be used for this synthesis is that the hydrocarbon polymers when heated with sulfur and a catalyst (accelerator) together with the usual compounding ingredients, shall yield more viscous or less liquid products, thus permitting a "cure" of the raw rubber. This is a general property of the hydrocarbons named, and is also essential to the success of the operation.

These conditions are met by a wide variety of hydrocarbons, such as those mentioned above (including under each group the corresponding cyclic compounds, as, for instance, under dienes cyclopentadiene, methyl and methylene cyclopentadiene, etc.). It is to be understood that the term "polymerizable hydrocarbon" where employed in the appended claims refers to hydrocarbons of the type described, generically.

The processes for producing a rubber-like product from such hydrocarbons may be briefly outlined in principle as follows, individual steps being discussed in more detail later.

A polymerizable hydrocarbon as set forth above is thoroughly emulsified with water or any other suitable liquid and certain important accessory substances, to be described more particularly hereinafter, to an emulsion of grain size similar to that of natural Hevea latex or approximating a diameter of 1 micron. The emulsified hydrocarbon may then be polymerized under conditions explained in more detail below, said conditions being adapted to establish the maximum strength and elasticity of the coagulum to be obtained later. The resulting emulsion of polymerized hydrocarbon is then coagulated by any of the methods ordinarily employed for the coagulation of natural latex. After drying, milling and curing by the known methods, rubber-like bodies are obtained, the precise properties varying with the nature of the hydrocarbon used, the degree and manner of polymerization, and the nature and amount of the accessory substances added during emulsification, etc.

The accessory substances mentioned above may be added during the emulsification or, alternatively, at any point before coagulation. In order to produce a stable emulsion it is desirable to add an emulsifying agent and a protective colloid to the hydrocarbon and water mixture. These two functions may be exerted by the same compound, for example, hydrophilic proteins as egg albumen, or a plurality of substances might be added, one or more lending chiefly the emulsifying function, the remainder chiefly the protective. For example, oil soluble sulfonic acid soaps recovered from the refining of petroleum are excellent emulsifying agents, as are gelatine, glue, casein, Turkey red oil and Twitchel's reagent while glue, gelatine, casein, shellac, agar-agar, or, in general, water or alkali soluble proteins are satisfactory protective agents. Water soluble proteins when used may function also as collecting agents and thereby much simplify subsequent operations by eliminating the necessity of mechanical collection or aggregation of the precipitate or coagulum. The precise method or agents employed for effecting emulsification is, however, not important, as any of the established methods of preparing stable emulsions of hydrocarbons in water may be employed.

In addition to the substances used for the preparation and stabilization of the emulsion of the hydrocarbon, to build up the desired rubber-like structure, it is preferred to add a water insoluble resinous body of a relatively soft and plastic or viscous nature, which body must be chemically of such a type as to remain substantially unaltered during the emulsification, polymerization, and subsequent coagulation. As the process of the invention involves a change from slightly alkaline to slightly acid conditions the resin must be substantially unaffected in its physical properties by low concentrations of either acid or alkali and must remain in substantially the same physical state in the pH range 3 to 10 in the presence of water. Typical resins possessing these properties are those obtained from Hevea rubber or guayule rubber by extraction with acetone. The addition of a resinous constituent of this type is a very important step as its presence confers the desired plasticity or viscosity in the external or continuous phase and is also essential to the development of the strength and elasticity of the finished product. The resinous constituent may be added either at the beginning of the polymerization or at any subsequent point up to the coagulation in the form of an aqueous emulsion or suspension, but must be present before coagulation is carried out. Obviously substances other than water insoluble resins which substances are soluble in water or very weakly alkaline aqueous solutions and are precipitated under the conditions of coagulation in the form of soft resinous bodies having properties similar to the water insoluble resins would be satisfactory for this purpose and could be substituted for the water insoluble resins.

Moreover, instead of using definite isolated resins such as the guayule resin referred to, the hydrocarbon emulsion can be mixed with a small quantity of rubber latex prior to coagulation or with the serum obtained upon the coagulation of latex. Under these conditions a certain amount of the water soluble constituents which normally go to waste in the natural rubber serum is taken up and utilized by the hydrocarbon of the synthetic emulsion. It is preferable in this case to add a small quantity of isolated resin which will still further improve the quality of the finished product. Where the term "resinous substance" or "resinous constituent" is employed hereinafter it is to be understood to refer generically to isolated amorphous bodies of ill defined or indefinite melting point which bodies are of the type described above, including substances which will be precipitated in the form of such amorphous bodies under the conditions of coagulation, as well as to mixtures containing such resins in unisolated form.

Since the hydrocarbons concerned in the process are highly unsaturated and consequently susceptible to oxidation, it is desirable to also incorporate in the emulsion one of the well-known rubber antioxidants in order to preclude oxidation of the coagulum to be obtained. It is also desirable, although not essential, to incorporate one of the rubber vulcanization accelerators, although this is of very minor importance as compared with the other substances. The amount of such substances to be employed will of course be varied according to the substances employed.

In preparing the emulsion, a mixer or a rotating agitator may be employed and it is preferable to agitate violently for sometime to reduce the size of the particles of hydrocarbon to substantially that of the particles present in Hevea latex or approximately to 1 micron in diameter. Substantial deviation in either direction from this particle size will materially reduce either the tensile strength or the elasticity of the synthetic rubber. It is therefore obviously desirable that the particle size be held as closely as possible to an average of 1 micron and also that the percentage of very large and very small particles be held very low.

The polymerization of the fluid hydrocarbon may be partially effected before emulsification and then carried on to the desired point or it may be emulsified without substantial polymerization and all the desired polymerization carried out subsequently to the emulsification. Any of the well known methods for effecting polymerization may be employed. The hydrocarbon may be allowed to stand exposed to the air until the desired condition is reached or it may be maintained at a suitable temperature, generally above normal, to accelerate the reaction, or a catalyst such as an oxidizing agent or an aromatic sulphonic acid may be employed in addition to heating. The use of ultra violet light is also a well known method of effecting polymerization of substances of the type of isoprene. The particular manner and conditions of effecting the polymerization are immaterial for the purposes of the present invention. After polymerization has been carried to the desired point, the emulsion is coagulated to obtain the rubber-like product.

The invention having been described above as applicable to polymerizable hydrocarbons in general, it will now be described with more particular reference to a preferred embodiment which involves the use of the reduction products of polymers prepared from acetylene. It is to be understood that the following description is merely illustrative of the manner of applying the process to polymerizable hydrocarbons in general.

The first step in this embodiment is the preparation, from acetylene, of the higher boiling polymers. The method of producing these particular polymers, however, is not a part of this invention but is the subject of separate patent applications. It may be stated here, however, that in the preferred form of this reaction, polymerization is carried out by treating with acetylene, at a temperature preferably not substantially over 30° C., a suspension of cuprous chloride and ammonium chloride in water and distilling off the resulting product. Any cuprous salt however, for example copper sulphate, and other alkali chlorides as sodium or potassium chloride may be used instead of the mixture of cuprous chloride and ammonium chloride, the essential requirement being that at least a small amount of the cuprous salt be in solution, and that the reaction mass should possess an acid or neutral, but not an alkaline, reaction. The polymers of acetylene, so obtained, may be recovered from the catalyst by several methods, as for instance by decomposing the complexes formed by means of acids, cyanides, or ammonia, or by simply heating and distilling off the polymers at atmospheric or reduced pressure, or by solvent extraction, or other obvious methods. In the preferred method of effecting polymerization given above, the polymer recovered is chiefly divinylacetylene, having the structural formula $H_2C=CH-C\equiv C-HC=CH_2$, but other polymers may be, and probably are, formed in great amounts under varying conditions. Evidence of the existence of one of these, methylene pentamethylene, has been found, and others might be shown to exist, but the precise structure of these hydrocarbons is immaterial for the purposes of this invention.

The hydrocarbon or hydrocarbon mixture thus obtained is a volatile liquid, polymerizing very rapidly under ordinary conditions to a viscous liquid and subsequently to a gelatinous or resinous solid, the latter being a violently explosive substance. The polymerization and development of explosive properties can be held in check by the exclusion of air or by the use of antioxidants, those suitable for rubber, for instance, hydroquinone, acetaldehyde aniline and phenyl alpha naphthylamine, being also suitable for use here. The stabilization by means of antioxidants, however, forms no inherent part of this invention, and is the subject of separate patent applications.

The hydrocarbon thus obtained by the cuprous salt reaction may be employed in the process or alternatively it may be partially reduced with, for instance, hydrogen and a catalyst, before incorporation into the emulsion. The degree of hydrogenation may vary, the criterion being that the hydrocarbon obtained must still possess the ability to polymerize.

Palladium, platinum, nickel, copper, or iron may be employed as the catalyst, with or without a promoter. A satisfactory hydrogen ratio may approximate 1½ moles of hydrogen to 1 mole of acetylene polymer but this ratio may be varied at will, bearing in mind, however, that if the hydrogenation is carried too far the products will not be polymerizable. The temperature should be kept as low as possible to avoid polymerization of the divinylacetylene in the catalyst chamber. Diluents may be added to the gas reaction mass to facilitate temperature control; any substance which is non-reducible and gaseous at the reaction temperature (saturated aliphatic hydrocarbons, aromatic and hydroaromatic hydrocarbons, water, fatty acids, alcohols) may be added. Alternatively, the catalyst may be suspended in the hydrocarbon, preferably in the presence of a solvent, and the reduction carried out in the liquid phase. For example, palladium black may be suspended in a 50% alcohol, 50% water solution of the hydrocarbon, and hydrogen passed in at 40° C. Rapid reduction takes place. If desired, the vigor of the vapor phase reduction may be reduced by working under reduced pressure, while the liquid phase reaction can be carried out under increased pressure to speed up the reaction if desired. Reducing the pressure also reduces the polymerization during reduction.

The reaction product, containing probably a mixture of the original hydrocarbon, trienes, dienes, olefine and paraffine hydrocarbon may be separated by fractional distillation or by chemical treatment. The dienes, for instance, may be recovered by forming the $SO_2$ derivative, the olefines by the formation of the sulphuric acid addition compound, the acetylene derivatives by means of the cuprous ammonium chloride complex, according to known methods.

The mixed reduction product or its separated constituents obtained by any of the methods indicated above is ready for emulsification and further polymerization and subsequent coagulation to obtain the final product as already described in connection with hydrocarbons generally. The polymerization may be effected by any of the methods already described in connection with hydrocarbons in general. A suitable degree of polymerization is attained when approximately 25% of the hydrocarbon is insoluble in benzene. Coagulation is then effected to produce the rubber-like body.

In order to better disclose the invention, specific examples of the application of the process to particular hydrocarbons are furnished below. It is to be understood, of course, that these examples are merely illustrative of the method already described as adapted for the treatment of polymerizable hydrocarbons generally.

*Example 1.*—To 100 parts of divinylacetylene obtained by the polymerization of acetylene there are added 200 parts of water, 2 parts of naphthenic acid sodium salts, and 1 part of gelatin. The mixture is agitated violently until it is found upon microscopic examination that the average particle size is 1 micron and that disproportionably large or small particles are chiefly absent. With this emulsion there is then mixed 1 part of guayule resin in the form of an aqueous suspension. The mixture is then allowed to stand for 7 days at room temperature (25° C.) to polymerize and there is then added 1 part of Hevea latex, which is thoroughly incorporated by gentle agitation. Two-tenths of a part of hydroquinone in the form of an aqueous solution are added. The mixture is then coagulated by the addition of sufficient 2% acetic acid to change the pH of the solution to approximately 4. The coagulum thus obtained is freed from water by milling and is ready for use as raw rubber.

*Example 2.*—Same as 1 except that the rubber latex is omitted and the guayule resin is increased to 3 parts per 100 of divinylacetylene.

*Example 3.*—To 100 parts of 1:4 dimethyl butadiene obtained, as already described, from the reduction products of divinylacetylene an emulsion is prepared as indicated in Example 1. After the addition of the resinous constituent, polymerization is carried out by heating to 25° C. for 6 months. After polymerization, the process is carried out as set forth in Example 1.

*Example 4.*—An emulsion is prepared as indicated in Example 1 but from the mixture of hydrocarbons resulting from the reduction of divinylacetylene with 1½ moles of hydrogen as described above. The emulsion is then mixed with 25% concentrated formic acid solution and heated to 80° C. for one month. A gelatinous polymer is formed, insoluble in alcohol.

It will be noticed that where other hydrocarbons than acetylene polymers are employed, the time required for effecting polymerization will generally be very materially increased. For example, to effect complete polymerization, under the conditions outlined above, of 1:4 dimethyl butadiene, a reduction product of divinylacetylene, the emulsion prepared from this hydrocarbon is maintained at 25° C. for about six months. Otherwise the procedure is substantially in accordance with that described for divinylacetylene.

The emulsion prior to coagulation strikingly resembles natural latex in its physical structure and properties. It is a two phase system containing hydrocarbon droplets as the disperse phase. The droplets of polymerized hydrocarbon are of uniform size approximating a diameter of 1 micron and are suspended in a continuous phase comprising, like natural latex, a resinous constituent. Due to the polymerization of the hydrocarbon in an emulsified state these droplets are made up of hydrocarbon spheroids encased in a layer of more viscous and more highly polymerized hydrocarbon.

The synthetic substances obtained by coagulation of such an emulsion as described exhibit to an unusual degree all the characteristics of natural rubber.

The resulting coagulum will vary in properties in accordance with the optional method used for its preparation, as well as with the extent to which the hydrocarbon has been polymerized before coagulation. Roughly, the fresh coagulum varies from the consistency of badly swelled freshly coagulated latex to that of normal coagulated latex, while after drying it varies from softened crepe rubber to normal crepe rubber. Under polymerization it will give a product resembling overmilled crepe.

The material produced by this process can be readily distinguished from previously prepared synthetic rubbers, by the fact that the diffraction pattern, obtained upon taking an X-ray photograph of the stretched material, is closely similar to that obtained from natural rubber, and is that ordinarily considered characteristic of a crystalline body, whereas the corresponding photographs of the other "synthetic rubbers" are characteristic of an amorphous body. In our opinion, this diffraction pattern is not necessarily indicative of a crystalline substance, but only of a substance in which the molecules possess definite orientation, although it has been commonly accepted in the past as evidence of crystallinity.

According to our working hypothesis, the material produced by this process consists essentially of a 2-phase liquid system. The inner, or disperse, phase consists of small particles or globules, approximately 1 micron in diameter, composed of partially polymerized hydrocarbon, the degree of polymerization decreasing toward the center of the globules, or, in other words, the higher polymer tending to concentrate in the inter face between the two phases. The external phase consists of a highly viscous liquid or plastic solid, completely filling the capillary spaces between the globules, and these spaces between globules at no point exceed capillary dimensions. The external phase may be composed either of a resin, a mixture of a resin with a higher polymer of the hydrocarbon, or of the higher polymer only, and it is not essential that there be a clean-cut sharp dividing line between the two phases.

The finished product may be treated in the same general manner as raw rubber. It may be milled, the usual chemicals such as zinc oxide, sulfur, accelerators, carbon black, softeners, antioxidants, etc., incorporated. It can be cured, or vulcanized, by heat treatment applied in a manner similar to that used in curing natural rubber. It can also be cured with sulfur chloride, or, in general, by the methods and reagents used for natural rubber. The precise methods used form no part of this invention and are the subjects of separate patent applications. If desired, the coagulum may be sheeted, and an antioxidant incorporated during the sheeting. Alternatively, it may be dried in lumps or masses and not sheeted.

As numerous optional methods and combinations exist, the physical properties of the finished product are subject to an equally wide number of variations. The fundamental property common to all of the products made according to the procedure described is that of elasticity. All of the materials produced, suitably cured, possess elasticity to a marked degree, elongations of up to 800% having been obtained. The tensile strength varies with the precise mode of preparation, the hydrocarbon or hydrocarbons used, and the degree of polymerization. The other properties can also be varied widely by varying the factors just mentioned.

The materials thus prepared may be used as a general substitute for natural latex and natural rubber.

We claim:

1. The process of making a synthetic rubber-like material from a polymerizable hydrocarbon which comprises coagulating an emulsion of a polymerizable hydrocarbon, said emulsion containing a resinous constituent.

2. The process of making a rubber-like material from polymerizable hydrocarbons which comprises forming an aqueous emulsion containing the polymerized hydrocarbon, the emulsified particles of hydrocarbon being substantially the size of the particles present in Hevea latex, and coagulating said emulsion.

3. The process of making a latex-like liquid which comprises preparing an aqueous emulsion of a polymerizable hydrocarbon, said emulsion containing a resinous constituent.

4. The process of making a latex-like liquid which comprises preparing a mixture of a resinous constituent in an aqueous emulsion of a polymerizable hydrocarbon, the emulsified particles of hydrocarbon having a diameter of substantially 1 micron.

5. The process of making a rubber-like material which comprises forming an aqueous emulsion containing a polymerizable hydrocarbon and a resinous substance in which emulsion the particles of hydrocarbon have substantially the size of the particles present in natural latex, polymerizing the emulsified hydrocarbon and coagulating.

6. The process set forth in claim 5 in which the resinous substance comprises a mixture of guayule resin and natural latex.

7. The process of making a rubber-like material which comprises mixing a polymerizable hydrocarbon with water, an emulsifying agent and a protective colloid, agitating said mixture until the average particle size of the hydrocarbon is substantially 1 micron, incorporating with the resulting emulsion an aqueous suspension of a resinous constituent, effecting polymerization of the emulsified hydrocarbons, incorporating an antioxidant to effect stabilization and coagulating.

8. In the process of making a rubber-like material the step which comprises polymerizing the reduction products of divinylacetylene.

9. The process of making a latex-like liquid which comprises forming an emulsion of a polymerizable reduction product of divinylacetylene.

10. The process of making a rubber-like material which comprises coagulating an emulsion of a polymerized reduction product of divinylacetylene.

11. The process of making a rubber-like material which comprises mixing a polymerizable reduction product of divinylacetylene with water, an emulsifying agent and a protective colloid, agitating said mixture until the average particle size of the hydrocarbon is substantially 1 micron, incorporating with the resulting emulsion an aqueous suspension of a resinous constituent, effecting polymerization of the emulsified hydrocarbons, incorporating an antioxidant to effect stabilization and coagulating.

12. A synthetic latex-like liquid comprising an emulsion of a polymerized hydrocarbon, the emulsified particles of said hydrocarbon having a size substantially corresponding to the size of the particles present in Hevea-latex.

13. A synthetic latex-like liquid comprising an emulsion of a polymerizable hydrocarbon, in admixture with a resinous constituent.

14. A synthetic latex-like liquid comprising an emulsion of a polymerizable hydrocarbon, in admixture with a resinous constituent, the emulsified particles of said hydrocarbon being progressively less polymerized from their surfaces inwardly and having a size substantially corresponding to the size of the particles present in Hevea-latex.

15. A synthetic-latex-like liquid containing droplets of a polymerizable hydrocarbon of an approximate diameter of 1 micron, said droplets being suspended in a continuous phase comprising an aqueous suspension of a resinous substance.

16. A synthetic rubber-like product resulting from coagulating an emulsion of a polymerizable hydrocarbon, said emulsion containing a resinous constituent.

17. A rubber-like product resulting from forming an aqueous emulsion of a polymerized hydrocarbon, the emulsified particles of hydrocarbon being substantially the size of the particles present in Hevea-latex, and coagulating said emulsion.

18. A latex-like product resulting from preparing a mixture of a resinous constituent in an aqueous emulsion of a polymerizable hydrocarbon, the emulsified particles of hydrocarbon having a diameter of substantially 1 micron.

19. A rubber-like product resulting from forming an aqueous emulsion containing a polymerized hydrocarbon and a resinous substance, in which emulsion the particles of hydrocarbon have substantially the size of the particles present in natural latex, and coagulating.

20. A rubber-like product resulting from forming an aqueous emulsion containing a polymerizable hydrocarbon and a resinous substance comprising a mixture of guayule resin and natural latex, in which emulsion the particles of hydrocarbon have substantially the size of the particles present in natural latex, polymerizing the emulsified hydrocarbon and coagulating.

21. A rubber-like material comprising the polymerized reduction products of divinylacetylene.

22. A rubber-like product resulting from forming an aqueous emulsion containing a polymerizable reduction product of divinylacetylene and a resinous substance, in which emulsion the particles of hydrocarbon have substantially the size of the particles present in natural latex, polymerizing the emulsified reduction product and coagulating.

23. A synthetic rubber-like material showing, under the X-ray, a diffraction pattern of the type ordinarily considered characteristic of a crystalline body.

24. A rubber-like product comprising a 2-phase system, the disperse phase comprising particles of a polymerized reduction product of divinylacetylene and the external phase comprising a viscous liquid or plastic solid.

25. A rubber-like product comprising a 2-phase emulsoid system, the disperse phase comprising particles of polymerized hydrocarbon, the degree of polymerization decreasing toward the center of said particles, and the external phase comprising a viscous liquid or plastic solid, said system showing, under the X-ray, a diffraction pattern of the type ordinarily considered characteristic of a crystalline body.

26. The product set forth in claim 25 in which the external phase comprises a resinous constituent.

27. The process of making a synthetic rubber-like material from a polymerizable hydrocarbon which comprises coagulating an emulsion of the polymerized hydrocarbon, said emulsion containing a resinous constituent and a water soluble protein.

28. The process of making a rubber-like material which comprises coagulating an emulsion of a polymerized reduction product of divinylacetylene and a water soluble protein.

29. A synthetic rubber-like product resulting from coagulating an emulsion of a polymerized hydrocarbon, said emulsion containing a resinous constituent and a water soluble protein.

30. A rubber-like product resulting from coagulating an emulsion comprising the polymerized reduction products of divinylacetylene, a resinous constituent and a water soluble protein.

31. In the process of making a rubber-like material, the steps which comprise polymerizing a reduction product of a polymerizable acetylene polymer and coagulating.

32. The process of making a latex-like liquid which comprises forming an emulsion of a polymerizable reduction product of a polymerizable acetylene polymer.

33. The process of making a rubber-like material which comprises coagulating an emulsion of a polymerized reduction product of a polymerizable acetylene polymer and a water soluble protein.

34. The process of making a rubber-like material which comprises emulsifying a polymerizable reduction product of a polymerizable acetylene polymer, agitating said emulsion until the average particle size of the hydrocarbon is substantially 1 micron, incorporating with the resulting emulsion an aqueous suspension of a resinous constituent, effecting polymerization of the emulsified hydrocarbons, and coagulating.

35. A rubber-like material comprising the polymerized reduction products of a polymerizable acetylene polymer.

36. A rubber-like product resulting from forming an aqueous emulsion containing a polymerizable reduction product of a polymerizable acetylene polymer and a resinous substance, in which emulsion the particles of hydrocarbon have substantially the size of the particles present in natural latex, polymerizing the emulsified reduction product, and coagulating.

37. A rubber-like product obtainable by coagulating an emulsion comprising a polymerized reduction product of a polymerizable acetylene polymer, a resinous constituent and a water soluble protein.

38. A rubber-like product obtainable by emulsifying a polymerizable reduction product of a polymerizable acetylene polymer, agitating said emulsion until the average particle size of the hydrocarbon is substantially 1 micron, incorporating with the resulting emulsion an aqueous suspension of a resinous constituent, effecting polymerization of the emulsified hydrocarbon, and coagulating.

39. The process of making a latex-like liquid which comprises forming an emulsion of a resinous substance and a polymerizable reduction product of a polymerizable acetylene polymer and thereafter polymerizing the emulsified reduction product.

40. In the process of polymerizing a butadiene hydrocarbon in emulsion with water and an emulsifying agent, the step which comprises homogenizing the emulsion before polymerizing.

41. In the process of polymerizing a compound of the group consisting of butadiene-(1.3), isoprene and 2.3-dimethylbutadiene-(1.3), in emulsion with water and an emulsifying agent the step which comprises homogenizing the emulsion before polymerizing.

In testimony whereof we affix our signatures.

WILLIAM S. CALCOTT.
FREDERICK B. DOWNING.
DONALD H. POWERS.